US009811839B2

(12) United States Patent
Sundaram P

(10) Patent No.: US 9,811,839 B2
(45) Date of Patent: Nov. 7, 2017

(54) MULTIPLE CRM LOYALTY INTERFACE FRAMEWORK

(71) Applicant: Meenakshi Sundaram P, Walldorf (DE)

(72) Inventor: Meenakshi Sundaram P, Walldorf (DE)

(73) Assignee: SAP SE, Walldorf (DE)

(*) Notice: Subject to any disclaimer, the term of this patent is extended or adjusted under 35 U.S.C. 154(b) by 208 days.

(21) Appl. No.: 14/266,538

(22) Filed: Apr. 30, 2014

(65) Prior Publication Data

US 2015/0317664 A1 Nov. 5, 2015

(51) Int. Cl.
*G06Q 30/02* (2012.01)
*G06Q 10/06* (2012.01)
*G06Q 30/00* (2012.01)

(52) U.S. Cl.
CPC ......... *G06Q 30/0226* (2013.01); *G06Q 10/06* (2013.01); *G06Q 30/01* (2013.01); *G06Q 30/02* (2013.01)

(58) Field of Classification Search
CPC .... G06C 30/0226; G06C 10/06; G06C 30/01; G06C 30/02; G06F 17/30345; G06F 17/3056; G06F 17/30575
See application file for complete search history.

(56) References Cited

U.S. PATENT DOCUMENTS 5,893,079 A    4/1999  Cwenar
6,321,339 B1 * 11/2001 French .................... G06F 21/33
                                                         726/2

(Continued)

FOREIGN PATENT DOCUMENTS

EP    1811441 A1    7/2007
EP    2618279 A1    7/2013
                 (Continued)

OTHER PUBLICATIONS

"A conceptual framework for E-loyalty in Digital Business Environment", Author: Alireza Faed, DEBII, CBS, Curtin University of Technology Perth, Australia, Publication: 4th IEEE International Conference on Digital Ecosystems and Technologies (IEEE DEST 2010).*

*Primary Examiner* — Victoria Vanderhorst
*Assistant Examiner* — Victoria Frunzi
(74) *Attorney, Agent, or Firm* — Mintz Levin Cohn Ferris Glovsky and Popeo, P.C.

(57) ABSTRACT

A system and method for providing a customer loyalty framework for a customer relationship management (CRM) system. The framework includes an internal CRM system, an internal loyalty system and an internal enterprise resource planning (ERP) system. The internal CRM system has a CRM repository storing CRM data and the internal loyalty system has a loyalty repository storing loyalty data for one or more customers enrolled in a company loyalty program. The internal CRM system stores business logic that is executable by the internal loyalty system, the internal CRM system, and/or the internal ERP system to execute the company loyalty program. The system further includes an external CRM system connected with the internal network by an external communication network. The external CRM system generates a web user interface for receiving customer transaction data, and transmitting the customer transaction data via the external communication network to the internal network for processing by the internal CRM system, the internal loyalty system and an the internal ERP system according to the business logic.

14 Claims, 13 Drawing Sheets

(56) References Cited

U.S. PATENT DOCUMENTS

| | | | |
|---|---|---|---|
| 8,438,538 B2 | 5/2013 | Russ | |
| 9,582,560 B2* | 2/2017 | Tretikov | G06F 17/30575 |
| 2002/0157023 A1 | 10/2002 | Callahan et al. | |
| 2004/0093265 A1* | 5/2004 | Ramchandani | G06Q 30/02 |
| | | | 705/14.25 |
| 2005/0080757 A1 | 4/2005 | Sharma et al. | |
| 2008/0222630 A1* | 9/2008 | Taylor | G06Q 30/02 |
| | | | 717/176 |
| 2010/0293015 A1 | 11/2010 | Coglianese et al. | |
| 2011/0153712 A1 | 6/2011 | Whetsel | |
| 2013/0036094 A1* | 2/2013 | Fippel | G06Q 10/06 |
| | | | 707/640 |
| 2013/0124546 A1 | 5/2013 | Wormley et al. | |

FOREIGN PATENT DOCUMENTS

| | | |
|---|---|---|
| GB | 2399197 A | 9/2004 |
| JP | 2000181908 A | 6/2000 |
| WO | WO-0130009 A2 | 4/2001 |

\* cited by examiner

Figure 2

Partner: B1S1 Consulting / 21222 Walldorf

Save | ✕ Cancel | ☐ New | P2P Network Profile | Create Activity | Create Service Request ▼ Partner Details  ☑ Edit

| | |
|---|---|
| Partner ID: | 828812 |
| Name 1: | ☐ B1S1 Consulting |
| Name 2: | |
| Name 3: | |
| Name 4: | |

Main Address and Communication Data

| | |
|---|---|
| Street 2: | |
| Street/House Number: | test |
| Street 4: | |
| District: | |
| Postal Code/City: | 21222  Walldorf |
| PO Box: | |
| PO Box Postal Code: | |
| Region / State: | |
| Country: | ES |
| National Version(s): | ☐ |
| Tax Jurisdiction Code: | |
| Phone / Extension: | ES |
| Fax / Extension: | ES |
| E-Mail: | |
| Communication Method: | |
| Language: | ES |
| Website: | |
| Comments: | |

Additional Data

| | |
|---|---|
| Partner Status: | Active |
| PRM ID: | 15038 |
| CRM ID: | 1142999 |
| Corporate Group: | 0000 |
| SAP Region: | EMEA/Iberia |
| Territory: | |

▼ Partner Types   ☐ New   ☐ Additional PE Partner Type Request

| Partner Type | Level | Partner Type Status | Status Reason | Agreement Start Date | Agreement End Date | Partner Program |
|---|---|---|---|---|---|---|
| VAR | Gold | Operational | | 10.11.2011 | 31.12.2011 | SAP PartnerEdge |
| Services Partner | Bronze | Operational | | 23.04.2008 | 31.12.9999 | SAP PartnerEdge |
| Software Solution and Technol... | Bronze | Operational | | | | SAP PartnerEdge |

Figure 3

Partner: B1S1 Consulting / 21222 Walldorf　　　　　　　　　　　　　　　　　　　　　　　　　　　Back

Save | ✕ Cancel | ☐ New | P2P Network Profile | Create Activity | Create Service Request ▼ Partner Types　☐ New　☐ Additional PE Partner Type Request

| Partner Type | Level | Partner Type Status | Status Reason | Agreement Start Date | Agreement End Date | Partner Program |
|---|---|---|---|---|---|---|
| VAR | Gold | Operational | | 10.11.2011 | 31.12.2011 | SAP PartnerEdge |
| Services Partner | Bronze | Operational | | 23.04.2008 | 31.12.9999 | SAP PartnerEdge |
| Software Solution and Technol... | Bronze | Operational | | | | SAP PartnerEdge |

▼ Partner Type Dimension

| Partner Type | Dimension | Dimension Status | Date Achieved | End Date | Date of last check | Requested on | Requested by |
|---|---|---|---|---|---|---|---|
| Software Solution and Tec... | SAP B1 SSTP Authorization | For evaluation | 05.03.2012 | | | | |
| VAR | SAP AIO Product Authoriza... | Authorized | | | 05.02.2013 | 10.11.2011 | |
| VAR | | Confirmed | | | | 10.11.2011 | |

▼ Partner Relationships　☐ New

| Actions | Relationship | | Name | | Partner ID | | |
|---|---|---|---|---|---|---|---|
| ☐ ☐ | Is mVAR for BOBJ | | Ies1234567 tee | | 16331 | | |

▶ Notes　☐ New

No result found

▶ Contacts

▶ Partner Contact Functions

▶ SAP Contacts

▶ Industry Focus

▶ SAP Solution Focus

Figure 4

Loyalty Program: YSWTS, Software Solution and Technology Partner
Save | Cancel | Hide Hierarchy | New |

▼ Loyalty Program Details | Edit

Hierarchy

New | ↑ Up

| ID | Sort Sequence |
|---|---|
| ▽ YSWTS | |
| ▷ G-00000041 | 100 |
| ▷ G-00000042 | 200 |
| ▷ G-00000043 | 300 |
| ▷ G-00000044 | 400 |
| ▷ G-00000045 | 500 |
| G-00000046 | 600 |
| ▷ G-00000047 | 700 |
| ▷ G-00000048 | 800 |

General Data

ID: YSWTS
Description: Software Solution and Te....  English
Type: SAP PartnerEdge
Partner Track: Build
Marketing Organization:

Dates

Planned Start:
Planned Finish:

Status

Current Status: Released
New Status:

▼ Parties Involved  Edit List

| Partner Function | Partner ID | Name | Address | Country/Phone | Stand |
|---|---|---|---|---|---|
| Employee Responsible | 37212 | | (incomplete address) | | |

▶ Dynamic Attributes

▶ Change Documents

▶ Attachments

▶ Notes

Figure 5

Reward Rule Group: G-00000041, VP : Business Performance

Save | Cancel | Hide Hierarchy | 🗑

▼ Reward Rule Group Details  ✎ Edit

Hierarchy

☐ New  🗐  🗐  ✕  🗐  | Up

| ID | Sort Sequence |
|---|---|
| ▽ YSWTS | |
| ▷ G-00000041 | 100 |
| ▷ G-00000042 | 200 |
| ▷ G-00000043 | 300 |
| ▷ G-00000044 | 400 |
| ▷ G-00000045 | 500 |
| ▷ G-00000046 | 600 |
| ▷ G-00000047 | 700 |
| ▷ G-00000048 | 800 |

General Data

ID: G-00000041
Description: VP : Business Performance    English
Type: Standard (Expert Mode)
Combinability Type: All
Sequence: 100

Status

Current Status: Released
New Status:

▶ Parties Involved

▼ Versions | Edit List | Edit Scheduled Rule | Revise | Release | Import | Switch to Expert Mode Actions

| Version Number | Description | Release Date | Start Date | End Date | Status | Simulate |
|---|---|---|---|---|---|---|
| 003 | | | 19.07.2011 | 31.12.9999 | Editing | |
| 002 | | 17.07.2011 | 17.07.2011 | 31.12.9999 | Released | |
| 001 | | 15.07.2011 | 15.07.2011 | 16.07.2011 | Released | |

▶ Change History

Figure 6

Loyalty Reward Rule: R-00000165, Qualified or Certified Employees

Save | Cancel | Hide Hierarchy | ... | Saved Searches ▼ | Go

▼ Reward Rule Details  [Edit]

Hierarchy

New | Up

| ID | Sort Sequence |
|---|---|
| R-00000165 | 210 |

General Data

- ID: R-00000165
- Description: Qualified or Certified Em.... | English
- Type: Standard (Expert Mode)
- Reward Rule Group: G-00000022
- Campaign:
- Sequence: 210
- Status Profile:

Dates
- Start Date:
- End Date:

Status
- Current Status: Released
- New Status:

▼ Version  Edit List | Edit Scheduled Rule | Revise | Release | Import | Switch to Expert Mode Actions

| | Version Number | Release Date | Description | Start Date | End Date | Status | Simulate |
|---|---|---|---|---|---|---|---|
| | 003 | | | 20.07.2011 | 31.12.9999 | Editing | |
| | 002 | 17.07.2011 | | 17.07.2011 | 31.12.9999 | Released | |
| | 001 | 16.07.2011 | | 16.07.2011 | 16.07.2011 | Released | |

▼ Sponsoring Partners  Edit List
No result found

▶ Parties Involved

▶ Attachments

▶ Change History

▶ Notes

Figure 7

Display View "Define Object": Overview

Dialog Structure
- Define Object
  - Define Link Object
  - Define Log Object
  - Define Application
    - Define Application M
    - Process Type Defini
    - Add Event
      - Define Number Ran
      - Define Archive Sear
      - Define Search Obje
        - Add Table Relat
        - Add Search Obj
        - Result Object A

Define Object

| Object | Description | Object Class | Persist Class |
|---|---|---|---|
| YANNUALFEEINV | Annual Fee Invoicing | YCL_LOM_DIM_CHILD_ANNUAL_INV | YCL_LOM_AN |
| YAPL | OEM Approved Product list | YCL_LOM_MSH_CHILD_APL | YCL_LOM_MS |
| YDESCRIPTOR | Membership Descriptor | YCL_LOM_MSH_CHILD_DESCRIPTOR | YCL_LOM_MS |
| YDIMENSION | Membership Dimension | YCL_LOM_MSH_CHILD_DIMENSION | YCL_LOM_MS |
| YEXEMPTION | Dimension Exemptions | YCL_LOM_DIM_CHILD_EXEMPTION | YCL_LOM_DI |
| YFULFILLSTAT... | Dimension Fulfillment Status | YCL_LOM_DIM_CHILD_FFIL_STATUS | YCL_LOM_DI |
| YINDFOCUS | Industry Focus | YCL_LOM_CHILD_INDFO | YCL_LOM_FE |
| YINVOICE | Invoicing | YCL_LOM_INVOICE | YCL_LOM_IN |
| YOEM | OEM Approved Product list | YCL_LOM_MSH_CHILD_APL | YCL_LOM_MS |
| YOTHERPRREQ | Other Program Requirements | YCL_LOM_MSH_CHILD_OPR | YCL_LOM_MS |
| YSOLAREA | Solution Area | YCL_LOM_CHILD_SOLAREA | YCL_LOM_PE |
| YSOLFOCUS | Solution Focus | YCL_LOM_CHILD_SOLFO | YCL_LOM_PE |
| YSOLUTION | Dimension Solution | YCL_LOM_MSH_CHILD_SOLUTION | YCL_LOM_MS |
| YSOLUTIONNOT... | Dimension Solution Notes | CL_LOY_FRW_TEXT_OBJECT | CL_LOY_FRW |
| Y_PARTNER_AGR | Partner Agreement | YCL_RR_CHILD_AGREEMENT | YCL_RR_PER |

Figure 9

Change View "Loyalty Types": Overview

New Entries

Loyalty Types

| Type | Description | Category |
|---|---|---|
| LAIR | Air One Rewards | Loyalty Program |
| RRBM | Bonus Miles | Reward Rule |
| RRFM | Frequency Miles | Reward Rule |
| RRFT | Frequency Miles (Timed) | Reward Rule |
| RRGA | Standard | Reward Rule Group |
| RRGB | Standard (Expert Mode) | Reward Rule Group |
| RRGE | Standard (Expert Mode) | Reward Rule |
| RRPR | Simple Conditions | Reward Rule |
| RRTG | Standard (Timed) (Expert Mode) | Loyalty Program |
| SBUY | Super Buy | Loyalty Program |
| VAR | Value Added Reseller - Test | Loyalty Program |
| WFP | World Flyer Plus | Loyalty Program |
| YPSA | PSA Entitlements | Reward Rule |
| YRR1 | SAP Partner Edge RR | Reward Rule Group |
| YRRG | SAP Partner Edge RRG | Loyalty Program |
| YSPA | SAP Partner | Loyalty Program |
| YSPE | SAP PartnerEdge | |

MULTIPLE CRM LOYALTY INTERFACE FRAMEWORK

TECHNICAL FIELD

The subject matter described herein relates to customer relationship management (CRM) systems, and more specifically to a customer loyalty interface framework for a CRM system.

BACKGROUND

All companies face a number of different challenges. However, it has become increasingly important for a company to enhance the experience for each customer interacting with it. For example, customer churn, or the circumstance of losing a customer, can be very costly, as it may be many times more expensive to acquire a new customer than to keep an existing one. Thus, companies are seeking ways to retain customers by offering a superior experience, while delivering unique experiences to different customer segments.

In many industries, a relatively small percentage of customers represent a majority of a company's revenue, so a company will invest in the experience offered to high-value customer segments to enhance profitability. Customers today are empowered with information, and they evaluate their relationship with the company with respect to their own unique needs. However, companies often lack a rich set of data about customer behavior and insights. Without a way to collect a robust set of customer data, a company may be inclined to monitor only what is easy to measure, and will usually not develop deep insights derived from customer interactions.

Loyalty management can be implemented by systems across multiple industries where customer loyalty programs are utilized to build customer relationships and to promote specific customer behaviors. Loyalty management enables marketers to plan and execute closed loop loyalty programs, such as frequent flyer programs, for example. These programs can promote customers participation through points/reward programs where certain amounts of points are earned for a specific customer behavior. In turn, customers can redeem these points for specified rewards.

Loyalty programs helps to promote specific customer behaviors by providing benefits (such as rewards for miles flown) which can help enhance the customer experience. While companies often view such point-based programs as a fast way to enhance profitability by inducing customers to buy their goods or services, they are finding that there is a much greater value provided by more comprehensive loyalty programs that rely on the collection of information from program members. Companies can then use this data to develop a 360-degree view of customer interactions and determine how best to tailor process enhancements by segment—particularly for high-value customers. By implementing loyalty programs that are integrated across sales, service, and marketing—i.e., across all channels of interaction—a firm can greatly enhance the customer experience, increase customer retention, and foster the development of a community of people who serve as advocates for the business.

A single loyalty management system for real world customers is not conventionally deployed due to existing complex CRM landscapes and complex business processes, which are spread across multiple systems. Customers are reluctant to expose their critical data outside their own firewall, so they usually segregate the external facing UI and keep the data separately. Presently, in multiple CRM and ERP systems, i.e. when the UI is one system, the business logic is in another system, and the data is stored across multiple systems, there is no standard framework that can be used to communicate between these multiple CRM systems and ERP systems.

SUMMARY

This document presents a multiple CRM loyalty interface framework system and method. The system supports collecting meaningful customer data to be used for subsequent decision making, strengthen a company's brand, and improve customer retention. As will be described in further detail below, the system provides additional features such as collaboration, integration, and analytics.

The system and method described herein can be configured and implemented on existing CRM landscapes, which employ complex business processes across multiple systems. In one aspect, loyalty programs are supported with software for program management, reward rules management, and membership handling. The core of the solution is a highly scalable engine that processes member activities and tier-level changes against the rules of the program that are stored in a separate system. This loyalty management solution can be integrated with all aspects of existing CRM systems, including marketing, interaction centers, sales, and channel management. For example, brand owners can design and execute closed-loop loyalty based marketing campaigns, while program members can access their accounts using their preferred channel.

In one aspect, a loyalty interface framework includes a user interface (UI) that is external (i.e., outside a firewall, or external to the "de-militarized zone" (DMZ) for channel partners), and business logic that is implemented in a separate system. The loyalty interface framework further includes a Secure Network Zone (SNZ) to store the data in the system. A flexible solution which can be configured to meet various loyalty management business strategies across different Industries. Can be configured for company as well as individual rule processing requirements. A performance optimized solution, designed for mass processing.

In one aspect, a system for providing a customer loyalty framework for a customer relationship management (CRM) system is disclosed. The system includes an internal loyalty system and an internal enterprise resource planning (ERP) system. The internal CRM system has a CRM repository storing CRM data and the internal loyalty system has a loyalty repository storing loyalty data for one or more customers enrolled in a company loyalty program. The internal CRM system stores business logic that is executable by the internal loyalty system, the internal CRM system, and/or the internal ERP system to execute the company loyalty program. The system further includes an external CRM system connected with the internal network by an external communication network. The external CRM system generates a web user interface for receiving customer transaction data, and transmitting the customer transaction data via the external communication network to the internal network for processing by the internal CRM system, the internal loyalty system and an the internal ERP system according to the business logic.

In another aspect, a method includes reading, from an external application by an application server hosted in an external CRM system, member activities related to each of one or more customers of a company loyalty program, and determining, by the external CRM system, loyalty program information for at least one of the one or more customers of the company loyalty program, the loyalty program information including membership data of the least one of the one or more customers. The method further includes determining, by an internal CRM system storing a rule group assigned to the company loyalty program, an applicability of one or more rules of the rule group to the member activities. The method further includes processing, by the internal CRM system, the one or more rules based on the member activities for an associated one or more customers of the company loyalty program.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 shows an example of a Membership Overview page UI;

FIG. 3 shows an example of a Partner Overview page UI with partner types;

FIG. 4 shows an example of the Partner Overview page UI with partner type dimension and relationship;

FIG. 5 shows an example of a loyalty program overview page UI;

FIG. 6 shows an example of a loyalty reward rule group overview page UI;

FIG. 7 shows an example of a loyalty reward rule overview page UI;

FIG. 9 shows customizing for a CRM loyalty program;

FIG. 10 shows customizing for loyalty types in a CRM system;

FIG. 11 shows customizing for a program type in a CRM system;

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a loyalty interface framework for a common UI to multiple CRM and loyalty management systems.

Figure 1:
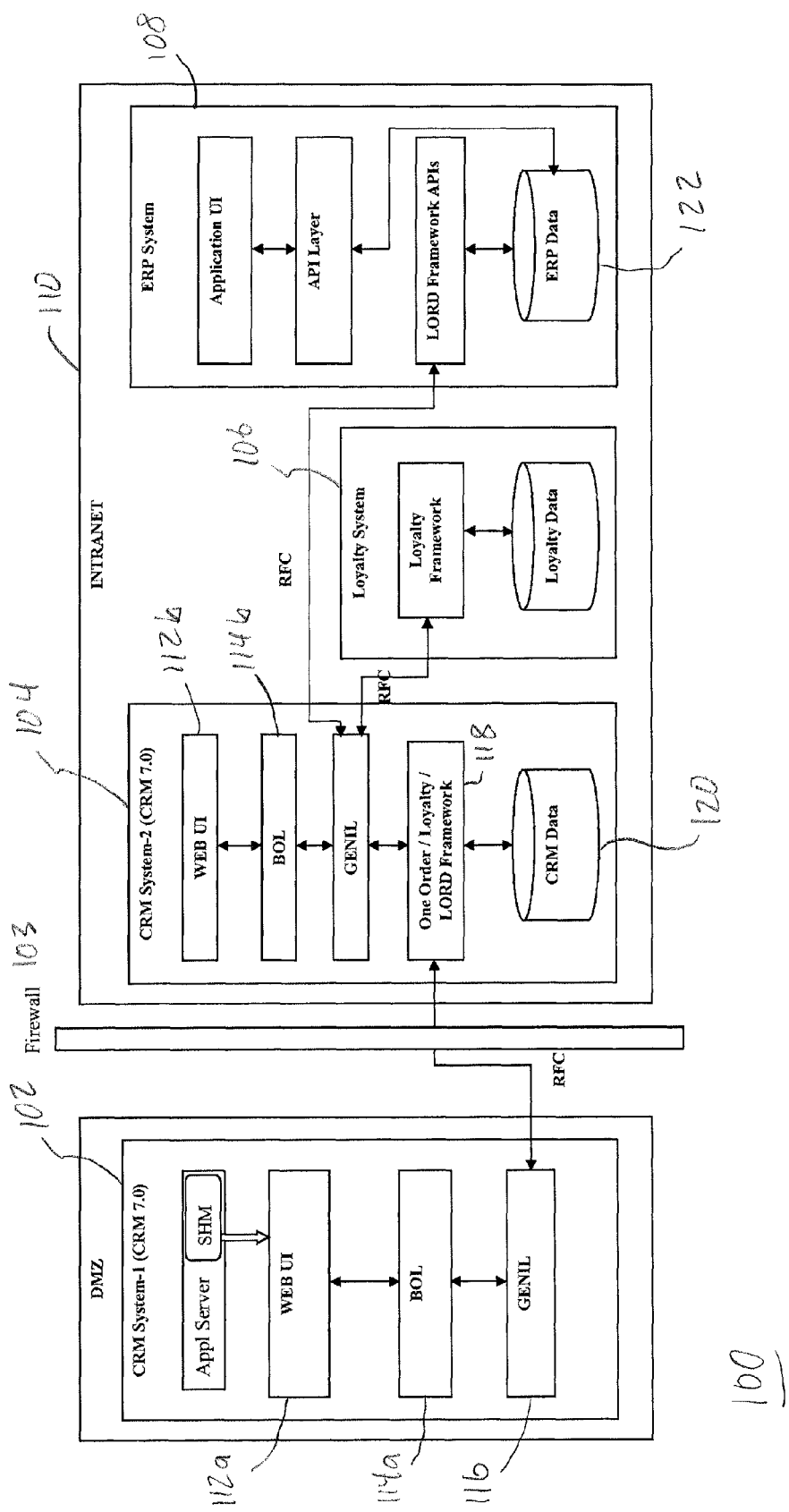
FIG. 1 is a block diagram showing multiple CRM systems integrated with loyalty and ERP systems using a loyalty interface framework.

FIG. 1 is a block diagram of a loyalty interface framework system 100 showing multiple CRM systems 102, 104 integrated with a loyalty system 106 and an enterprise resource management (ERP) system 108 using a loyalty interface framework. In the system 100 shown, CRM system 102 is implemented externally in a DMZ (hereafter "DMZ CRM system") while CRM system 104 (hereafter "internal CRM system") is implemented on an intranet 110. A key for the loyalty interface framework system 100 is a Web UI 112 and a business object layer (BOL) 114 model (in DMZ CRM system 102) which interact via remote function call (RFC) Function Modules in each of internal CRM system 104, loyalty system 106, and ERP system 108, so no data will be persisted in the DMZ CRM system 102. The communication from DMZ CRM system 102 to ERP system 108 occurs via internal CRM system 104. Since loyalty applications need to handle huge volumes of data, loyalty rules are executed separately to avoid resource contention on the database level and application server level between such loyalty applications executed by the loyalty system 106 and CRM applications executed by the internal CRM system 108.

The RFC Calls from a generic interface layer (GENIL) 116 in the DMZ CRM system 102 to the internal CRM system 104 need to be minimized. For example, when retrieving details of a document, only one call should be made to retrieve all information regarding that particular object, and not several calls each retrieving only a subset of the information. In some implementations, the RFC connection can have a generic communication user with profiles, so any authorization check to be done in the ERP system 108 is done with the information provided in the RFC call itself.

In accordance with preferred implementations, the loyalty system 106 is a scalable processing engine that supports online and batch processing of member activities, tier evaluation processing, point expiration processing, etc. The loyalty engine 106 can be accessed from all relevant CRM processes across customer services via a call center or the Internet, marketing campaign management (MCM), customer analytics, and others. This architecture also provides loyalty management processes with the integration capabilities to integrate to legacy ERP systems as well as to third party systems.

In some implementations, an RFC call to display or maintain a document can make use of a "One Order/Loyalty/Lean Order" (LORD) framework 118 in the internal CRM system 104 depending on the data from the UI 112. This must be RFC enabled by a generic wrapper function module.

Follow up documents such as sales orders, contracts, etc. are created in the ERP system 108 with the data provided from the UI 112 in DMZ CRM system 102, and passed via the internal CRM system 104 to the ERP system 108. Preferably, there is no direct connection between the DMZ CRM system 102 and the internal ERP system 108 due to security reasons. The data is stored in internal CRM and ERP tables in CRM data repository 120 and ER repository 122, respectively, and not in the DMZ CRM system 102.

There are three generic RFC users which are used for communication purposes from the DMZ CRM system 102 to the internal CRM system 104, from the internal CRM system 104 to the internal ERP system 108, and from internal CRM system 104 to the internal loyalty system 106. The different rules are processed in the loyalty system 106. The internal CRM system 104, the loyalty system 106, and the ERP system 108 located inside a firewall. These three "generic users" have the needed roles and profiles for creating the transactional documents in the CRM and ERP systems 104, 108. The needed customizing data is kept in the shared memory 103 of the DMZ CRM system 102 to avoid performance issues.

Different business events are triggered in the internal CRM system 104 and the loyalty system 106 based on the data from the DMZ CRM system 102, since the business logic resides in the internal CRM system 104 and loyalty system 106. The business events include notification triggering to the needed end users of the application, as well as business rules execution.

Multiple Web UI components can be created and enhanced for Membership, Tiers, Programs, Dimension, Partner Solution, Validate Expertise, Versioning, Training Matrix, Training Transfer, Mass Activity Points, Notes, Partner and Attachments etc. in the DMZ CRM system 102. The existing BOL model can be enhanced to handle data transfers between each Web UI and RFC Function Module in the internal CRM and ERP systems 104, 108, with the support of toolbox classes, which call the RFC function modules in the internal CRM, loyalty and ERP systems 104, 106 and 108. This toolbox class has different methods to READ and MAP the different sub-objects in transaction documents, along with READ and SAVE methods. The RFC function modules calls the One Order/Loyalty/LORD interface 118 which in turn handles the READ, MODIFY and SAVE in the CRM and ERP systems 104, 108.

The data is received from various channels such as the Internet (i.e., the DMZ CRM system 102), from a CRM-like interaction center, a CRM UI, and from via external applications via Web services. The loyalty interface framework system 100 processes Program Management, Membership handling, Point Accruals, Member Activities, Reward Rule Management, Point Activities like Redemption, Expiration, Accruals, Points Determination by rule engine of the loyalty system 106.

Loyalty program management enables set up and maintenance of loyalty programs. Program maintenance includes information about program-related loyalty status levels, tier groups and levels, set up and maintenance of point accounts, as well as program specific point accrual and redemption etc. Loyalty reward rule management includes set up and maintenance of loyalty rules and conditions which are finally being processed by the loyalty system. All points accrued and redeemed by members are recorded within the member's point account.

Loyalty membership represents the participation of an individual person, or organization to a specific loyalty program. Membership is opened by a registration to the loyalty program, either via web-self-service, or call center. It also includes member activities such as sales activities which are finally being accrued or redeemed as points. The loyalty processing engine is highly scalable to process member activities and tier transition evaluation, and is the "heart" of the CRM-based loyalty management solution described herein.

As described above, the loyalty processing engine is one or more layers of the loyalty system, and can be implemented as a scalable processor that either runs online or in batch mode to process member activities. Processing a member's activity will update the member's point account as well as the tier level if certain conditions, as defined in the loyalty program, have been met. Furthermore, in order to continuously check if a certain tier level is still applicable and if accrued points are due to expire based on company and program specific rules and policies, the loyalty processing engine also supports ongoing tier evaluation and point expiration processing. It also supports other activities such as: Accrue & Redeem Points, Update Attributes, Change Tier, Customer Specific Actions etc. Master data synchronization is done from the internal CRM system 104 to the loyalty system 106 for business objects such as Business Partners, Product, Rules, etc.

The basic processing steps of the loyalty processing engine are described in further detail below. Member activities, usually sent by an external application, are read. In this context, all relevant information such as loyalty program, membership, and the member itself can be determined. For each reward rule group being assigned to the loyalty program, the CRM-based loyalty processing engine determines the applicability of the assigned rule, and checks if a campaign has been associated and if enrollment was required. If the member has been enrolled and therefore participates in the promotional campaign, the corresponding rule will be processed and a certain action will be executed. Each action, based on a member's point account, includes accrual, redemption, and return actions to update the point balance. Or, as far as the individual tier levels are concerned, actions can change the tier level, reset or change dynamic member attributes, or execute any other customer specific logic.

The needed customizing details like Status, Categories, Phases, Date Types, Reason Codes, Text types, Partner Functions, Process types, Distribution Channel, Sales Stages, Priority etc. from the internal CRM system 104 are sent to the DMZ CRM system 102 via a report program, which pulls all the needed data from different tables in the internal CRM system repository 120. These details are stored in a shared memory in the DMZ CRM 102 so that multiple RFC calls to the internal CRM system 104 is avoided each time to get the needed details. The shared memory is populated only once in a day with a background job in the DMZ CRM system 102.

In preferred implementations, the web UI 112 is filled with dropdown values which are taken from the shared memory in the DMZ CRM system 102. This approach helps in improving the application performance. The validation business logic resides in the internal CRM system 104, which takes care of any needed authorization checks, mandatory field checks, field validation checks, and proper message handling, etc. when the required fields are entered in the web UI 112 and when the validation is completed in the internal CRM system 104, the data is saved in the database tables in the internal CRM, loyalty and ERP systems 104, 106 and 108. The DMZ CRM system 102 pulls the needed information like partner sales, revenue details, partner credit information, funds details, and status information, from the ERP system 108 via the internal CRM system 104.

Figure 2:
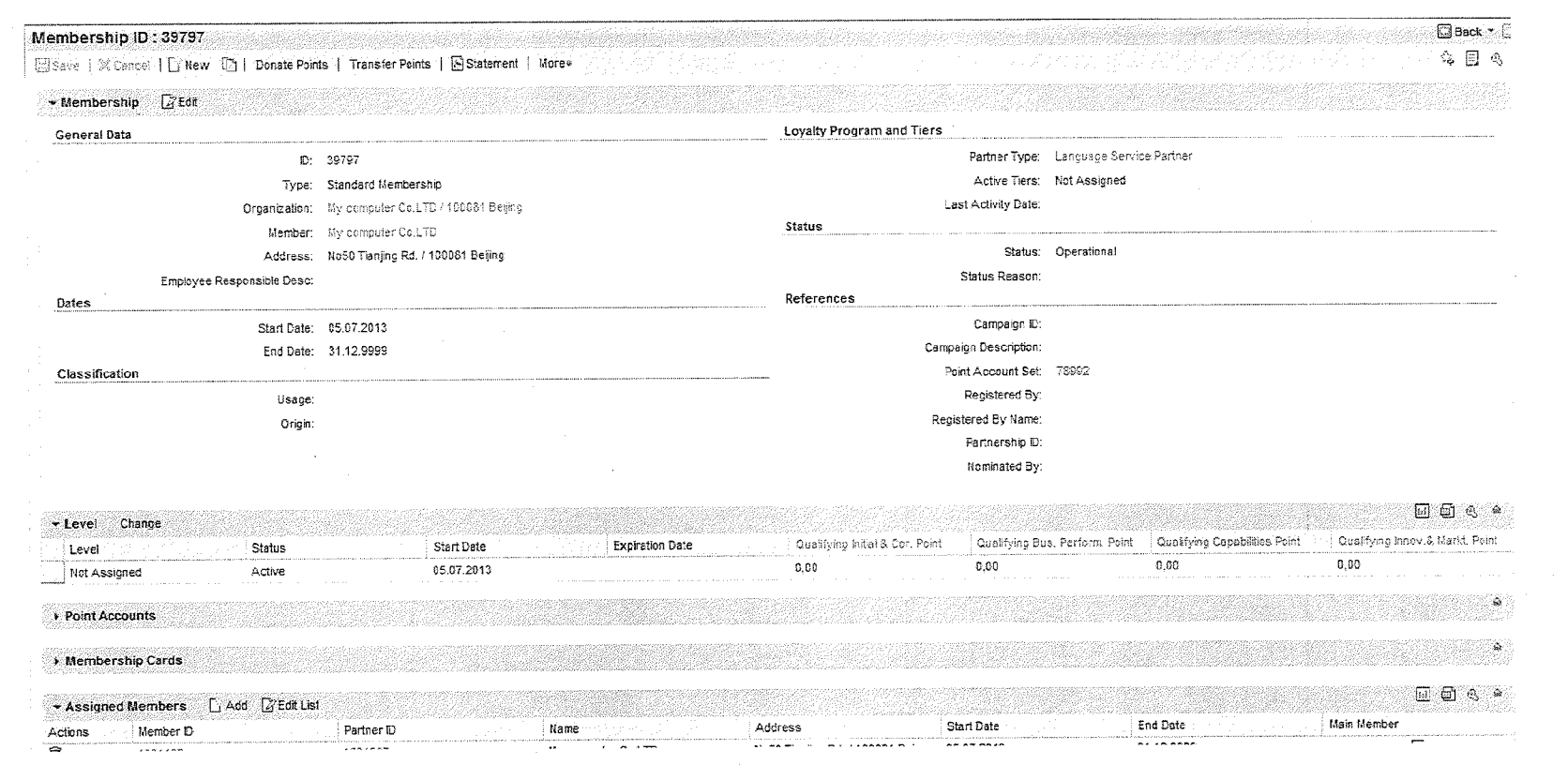

In accordance with exemplary implementations, a number of webpages can be generated by the loyalty interface framework and displayed in the web UI 112a and 112b. FIG. 2 shows an example of a Membership Overview page UI. FIG. 3 shows an example of a Partner Overview page UI with partner types, and FIG. 4 shows an example of the Partner Overview page UI with partner type dimension and relationship. FIG. 5 shows an example of a loyalty program overview page UI, FIG. 6 shows an example of a loyalty reward rule group overview page UI, and FIG. 7 shows an example of a loyalty reward rule overview page UI.

In accordance with preferred implementations, a package hierarchy can be provided for the different UI components, GENIL components, database tables, shared memory classes, message classes, toolbox classes, data dictionary objects, OTR texts, authorization objects, report programs, enterprise services, enhancements, etc.

Figure 8:
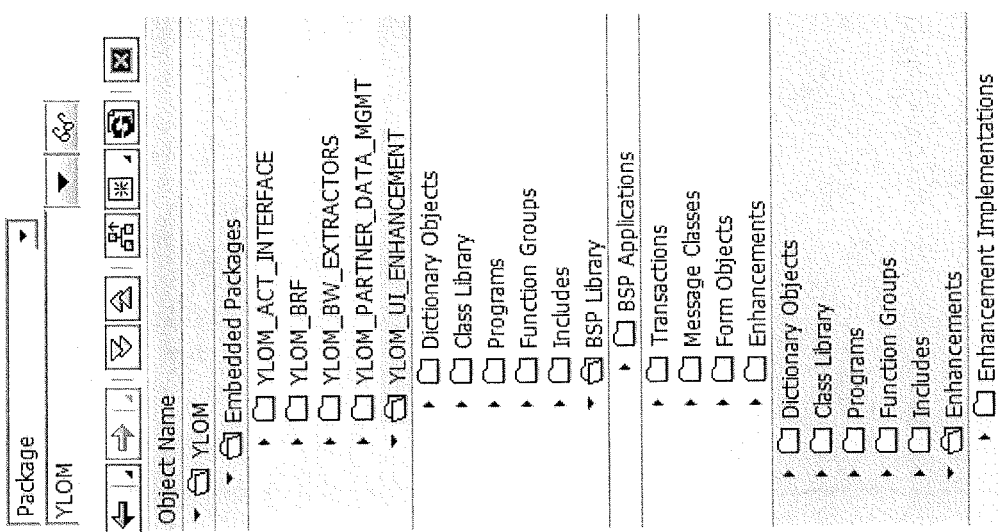
FIG. 8 illustrates one example of a UI layer.

Different packages can be provided for storing different layers in the loyalty interface framework which is stored in the DMZ CRM system 102, and the internal CRM, loyalty and ERP systems 104, 106 and 108. The different UI components can be stored in one package, the BOL and GENIL components can stored in one package, the function groups can be stored in one package, the proxy objects can be stored in one package etc. as shown in FIG. 8, which shows an exemplary package structure of the loyalty interface framework application in the DMZ CRM system 102. As shown in FIG. 8, the UI layer can have different Web UI components such as: YVERSION_MAIN, YBT126H_CALL, YLOM_MASSUPDATE, YLOM_MAIN, YLOM_TRNGMATX, YLOM_TRNGTRNSFR, YGSTEXT, YLOM101H_MA, YLOM102A_MSTIER, YLOM102H_MSH_PM, YLOM102M_MS, YLOM102S_MSH, YLOM105A_PR, YLOMBP_DIMS, YLOMH_ISV_SOL, YLOMMEM_ANREV, YLOMS_PLAT_SOL, YLOM_PLAT_SOL etc.

The Business Object Layer (BOL) 114a and 114b provides modeling of business objects, relations, attributes, searches, access to other business objects, and allows create, read, change, and delete access. The BOL also provides: communication of error and warning messages; subordinate, superordinate and related business objects; root object, dependent object, and access objects; aggregations, associations, relations; buffering of object model, business object properties, relations and changes; and memory and performance optimization.

The GENIL 116 provides a GENIL object model to describe the inner structure of business objects (BOs), which can be defined according to an aggregation hierarchy lead by a root object. Each model object can be understood as a business object node. Business object nodes have only flat structured attributes and are non-overlapping.

Model objects can be connected via relations. Relations can be either of aggregation/composition or association type. Aggregation and composition is only possible between BO nodes of the same BO, associations are also possible to BO nodes of other BOs. In this case the target object needs to be an access object.

Relations are always unidirectional with a defined source and target object. A target object can have multiple parents. This is possible on object type and instance level. Relations have no attributes. Object and relation names have to be unique in the whole model build of the models of the loaded components.

Figure 11:
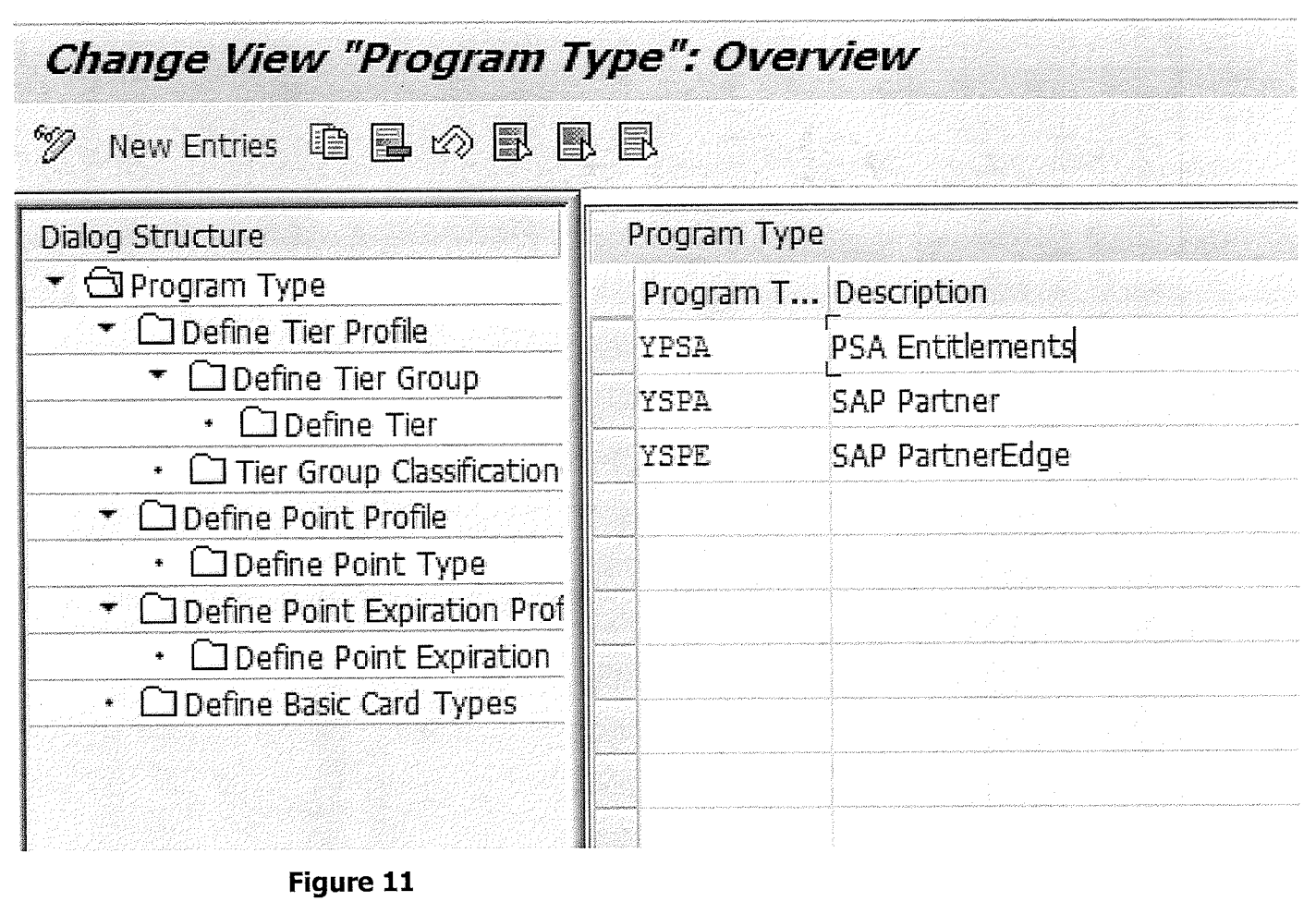
Figure 12:
FIG. 12 shows customizing of member activity categories in a CRM system.
Figure 13:
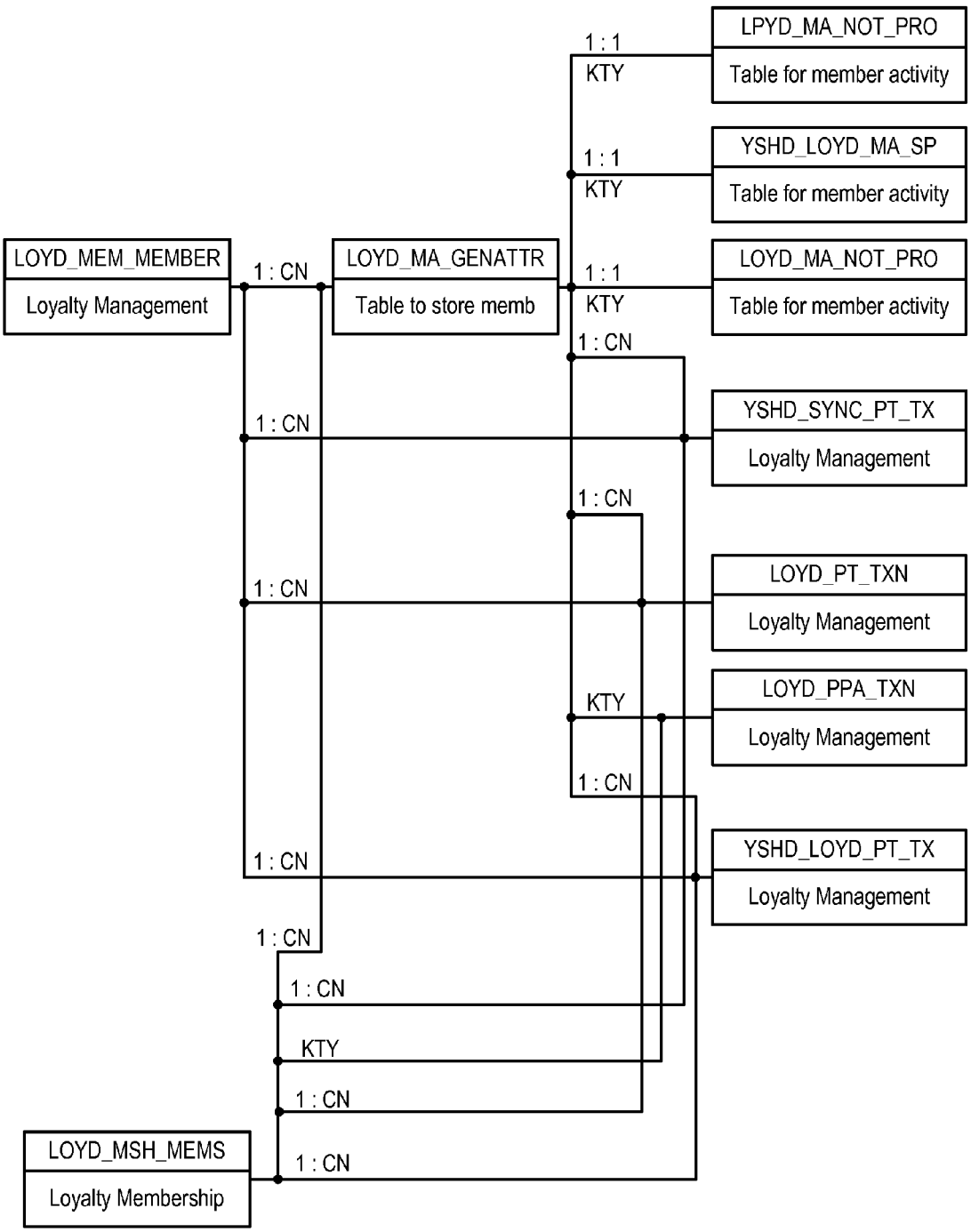
FIG. 13 is a partial representation of a data model of the loyalty interface framework in the CRM system.

FIGS. 9-13 show various customizing that may be needed when different objects are needed for loyalty management. FIG. 9 shows customizing for a CRM loyalty program, FIG. 10 shows customizing for loyalty types in a CRM system, FIG. 11 shows customizing for a program type in a CRM system, and FIG. 12 shows customizing of member activity categories in a CRM system. FIG. 13 is a partial representation of a data model of the loyalty interface framework in the CRM system.

The framework as implemented in a system and method described herein helps to save the data in an internal CRM system and loyalty system, while keeping the UI in the DMZ CRM system and business logic in the internal CRM and loyalty system. The RFC calls of Read and Save of the UI are optimized in such a manner that it does not hamper performance. The master data needed for creating the transactions, and the values for drop down fields in the UI are pulled from a shared memory in the DMZ CRM so that unnecessary calls to the internal CRM, loyalty and ERP systems are avoided, which leads to better performance.

In this framework, the communication occurs with the UI in the DMZ CRM system, the business logic is in the internal CRM and Loyalty systems, and the RFC Function modules and database tables are in internal CRM and ERP systems. This flexible solution can be configured to meet various loyalty management business strategies across different industries.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations for customer relationship management (CRM) comprising:
    receiving, at an external CRM system and via a web user interface, customer activity information for one or more customers of a company, wherein the customer activity information comprises sales activity information;
    communicating, by the external CRM system and through remote function calls, the customer activity information to an enterprise resource planning (ERP) system, wherein there is no direct communication between the external CRM and the ERP system, wherein the ERP system is located within a firewall, and wherein the communicating includes:
        transmitting, from the external CRM system and through remote function calls, the customer activity information to an internal CRM system within the firewall, wherein the customer activity information is not persisted at the external CRM system,
        validating, at the internal CRM system, the customer activity information according to business logic, and
        providing, by the internal CRM system and through remote function calls, validated customer activity information to the ERP system;
    generating, at the ERP system, a sales order based at least in part on the validated customer activity information;
    providing, by the internal CRM system and through remote function calls, the validated customer activity information to a loyalty system within the firewall, wherein the loyalty system manages a customer loyalty program for the company;
    processing, by the loyalty system, the validated customer activity information, according to one or more rules associated with the loyalty program, to update a loyalty points balance for the one or more customers; and
    storing, by the internal CRM system and/or the loyalty system, the validated customer activity information at a CRM repository of the internal CRM system and/or a loyalty repository of the loyalty system.

2. The computer program product in accordance with claim 1, wherein the instructions further cause the at least one programmable processor to perform operations comprising:
    determining, at the internal CRM system, if an enrollment to the customer loyalty program by the one or more customers is required.

3. The computer program product in accordance with claim 2, wherein the instructions further cause the at least one programmable processor to perform operations comprising:
    processing, at the loyalty system when the enrollment is determined to not be required, the one or more rules associated with the customer loyalty program to execute a corresponding one or more actions on the customer loyalty program.

4. The computer program product in accordance with claim 3, wherein the one or more actions includes at least one of an accrual, redemption, and return of customer loyalty points from the customer loyalty program.

5. The computer program product in accordance with claim 3, wherein the one or more actions includes at least one of changing a tier level, resetting the tier level, and changing member attributes for the customer loyalty program for the associated one or more customers.

6. The computer program product in accordance with claim 1, wherein the internal CRM system and the ERP system operate using first processing resources, wherein the loyalty system uses second processing resources, and wherein the first processing resources are separate from the second processing resources.

7. The computer program product in accordance with claim 1, wherein the validating the customer activity information according to business logic comprises performing, at the internal CRM system on the customer activity information, authorization checks and field validation checks.

8. The computer program product in accordance with claim 1, wherein the instructions further cause the at least one programmable processor to perform operations comprising:
- providing, from the internal CRM system to the external system, customization information via a report program for storage at the external system; and
- providing, at the external CRM system, the web user interface based on the stored customization information.

9. A system for customer relationship management (CRM) comprising:
- at least one programmable processor; and
- a machine-readable medium storing instructions that, when executed by the at least one processor, cause the at least one programmable processor to perform operations comprising:
  - receiving, at an external CRM system and via a web user interface, customer activity information for one or more customers of a company, wherein the customer activity information comprises sales activity information;
  - communicating, by the external CRM system and through remote function calls, the customer activity information to an enterprise resource planning (ERP) system, wherein there is no direct communication between the external CRM and the ERP system, wherein the ERP system is located within a firewall, and wherein the communicating includes:
    - transmitting, from the external CRM system and through remote function calls, the customer activity information to an internal CRM system within the firewall, wherein the customer activity information is not persisted at the external CRM system,
    - validating, at the internal CRM system, the customer activity information according to business logic, and
    - providing, by the internal CRM system and through remote function calls, validated customer activity information to the ERP system;
  - generating, at the ERP system, a sales order based at least in part on the validated customer activity information;
  - providing, by the internal CRM system and through remote function calls, the validated customer activity information to a loyalty system within the firewall, wherein the loyalty system manages a customer loyalty program for the company;
  - processing, by the loyalty system, the validated customer activity information, according to one or more rules associated with the loyalty program, to update a loyalty points balance for the one or more customers; and
  - storing, by the internal CRM system and/or the loyalty system, the validated customer activity information at a CRM repository of the internal CRM system and/or a loyalty repository of the loyalty system.

10. The system in accordance with claim 9, wherein the instructions further cause the at least one programmable processor to perform operations comprising:
- determining, at the internal CRM system, if an enrollment to the customer loyalty program by the one or more customers is required.

11. The system in accordance with claim 10, wherein the instructions further cause the at least one programmable processor to perform operations comprising:
- processing, at the loyalty system when the enrollment is determined to not be required, the one or more rules associated with the customer loyalty program to execute a corresponding one or more actions on the customer loyalty program.

12. The system in accordance with claim 11, wherein the one or more actions includes at least one of an accrual, redemption, and return of customer loyalty points from the customer loyalty program.

13. The system in accordance with claim 11, wherein the one or more actions includes at least one of changing a tier level, resetting the tier level, and changing member attributes for the customer loyalty program for the associated one or more customers.

14. A computer-implemented method for customer relationship management (CRM) comprising:
- receiving, at an external CRM system and via a web user interface, customer activity information for one or more customers of a company, wherein the customer activity information comprises sales activity information;
- communicating, by the external CRM system and through remote function calls, the customer activity information to an enterprise resource planning (ERP) system, wherein there is no direct communication between the external CRM and the ERP system, wherein the ERP system is located within a firewall, and wherein the communicating includes:
  - transmitting, from the external CRM system and through remote function calls, the customer activity information to an internal CRM system within the firewall, wherein the customer activity information is not persisted at the external CRM system,
  - validating, at the internal CRM system, the customer activity information according to business logic, and
  - providing, by the internal CRM system and through remote function calls, validated customer activity information to the ERP system;
- generating, at the ERP system, a sales order based at least in part on the validated customer activity information;
- providing, by the internal CRM system and through remote function calls, the validated customer activity information to a loyalty system within the firewall, wherein the loyalty system manages a customer loyalty program for the company;
- processing, by the loyalty system, the validated customer activity information, according to one or more rules associated with the loyalty program, to update a loyalty points balance for the one or more customers; and
- storing, by the internal CRM system and/or the loyalty system, the validated customer activity information at a CRM repository of the internal CRM system and/or a loyalty repository of the loyalty system.

* * * * *